UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

RECOVERY OF THORIUM.

1,307,153.  Specification of Letters Patent.  Patented June 17, 1919.

No Drawing.  Application filed July 8, 1918.  Serial No. 243,882.

*To all whom it may concern:*

Be it known that I, LONNIE W. RYAN, a citizen of the United States, residing at Chicago, in the county of Cook and State of Illinois, have invented a new and useful Improvement in the Recovery of Thorium, of which the following is a specification.

My invention relates to the recovery of thorium and will be fully understood from the following specification.

Thorium fluorid is one of the most insoluble salts of thorium, with respect to solubility in concentrated mineral acids. It is also quite stable toward alkali metal hydroxids. I have discovered, however, that thorium fluorid is readily attacked by sodium carbonate solutions, being soluble (apparently as a double carbonate) both in concentrated and dilute solutions and in mixtures of sodium carbonate and sodium bicarbonate either hot or cold. These properties of thorium fluorid I make use of for the recovery of thorium in the following manner:

Starting with an acid or neutral solution of thorium, rare earth metals, zirconium, iron and titanium, as obtained from monazite sand, for example, the thorium content being approximately 44 pounds (calculated as oxid) and this oxid being approximately 60 per cent. of the total oxids present, hydrofluoric acid or a soluble fluorid, such as sodium fluorid, is added in sufficient amount to precipitate all the thorium and rare earths and to dissolve the precipitated zirconium. The titanium and iron present do not precipitate. For example, 125 pounds of 30 per cent. hydrofluoric acid will suffice for these results. After adding the hydrofluoric acid or sodium fluorid the mixture is stirred for about one hour, diluted to four or five hundred gallons, filtered and washed. The thorium and rare earths are now in the filter-cake, as fluorids, while the iron, titanium and zirconium have been washed out in the filtrate.

As a varient of this process of obtaining a thorium fluorid precipitate, it is possible to effect a considerable purification of the thorium at the time of precipitation, in accordance with the procedure described in my application No. 145,101, filed January 29, 1917, this procedure consisting essentially in employing as a precipitating agent an amount of a soluble fluorid which will bring down the thorium in a state of comparative purity.

The thorium fluorids obtained in either manner as above described are now dumped into a 150-gallon solution containing 140 pounds of sodium carbonate and 80 pounds of sodium bicarbonate, the preferred temperature being 60 to 80 degrees C. If desired, the sodium bicarbonate may be replaced by sodium carbonate, or ammonium carbonate may be substituted for the sodium carbonate and bicarbonate. The mixture is stirred for about one hour and filtered, the thorium going into solution and washing out with the filtrate. The bulk of the rare earth metals, particularly the cerium group, remain in the filter-cake. The yttrium group and ceric cerium is somewhat soluble in the carbonate solution. This rare earth residue is not appreciably soluble in mineral acids.

As a variant of the above described carbonate treatment the fluorids may be dumped into a concentrated boiling solution of 140 pounds of sodium carbonate and boiled for one hour. The mixture is then diluted to 150 gallons, 80 pounds of sodium bicarbonate or sodium carbonate is added, and agitation carried out for another hour at 60 to 80° C. This temperature need not be maintained, however, but may vary from a cold solution up to the boiling point which is noteworthy as distinguishing this fluorid process, since it is true in general that when other compounds of thorium are dissolved in a carbonate solution the temperature and degree of dilution must be accurately maintained to prevent re-precipitation of the thorium. After filtration the thorium is contained in the filtrate while the rare earths remain in the filter-cake, this residue, however, being soluble in mineral acids. Since the carbonate extraction of thorium will not, in general, make a perfect separation and it is often desirable to treat the residue for the recovery of any thorium remaining therein, this mode of procedure by which the residue is left in a soluble form is often of advantage.

The carbonate solution of thorium obtained in either manner as above described is now treated with a 25 per cent. solution of caustic soda, a slight excess being used, thereby effecting precipitation of the thorium as hydroxid. The mixture may now be diluted to four or five hundred gallons, agitated, filtered and washed.

The fluorid ion is substantially washed out in the filtrate and the thorium hydroxid is reasonably pure. This hydroxid may be dissolved in hydrochloric acid, employing a slight excess, and crystallized as a sulfate by the slow addition of sulfuric acid, according to the known methods.

The filtrate from the thorium hydroxid may be evaporated down to such concentration that the fluorid ion may be recovered as crystallized sodium fluorid in a reasonably pure state. This sodium fluorid thus recovered may be again used to effect the initial precipitation of the thorium as a fluorid.

It is to be particularly noted with respect to the above described process that the carbonate extraction of the fluorid precipitate constitutes a very effective means for getting rid of any phosphates which may have been brought down with the fluorid, such phosphates being ordinarily present in considerable amounts in any thorium-carrying solution obtained directly from monazite sands. The fluorid precipitation, whether carried out selectively as described in my earlier application referred to or not, necessarily produces a separation from iron, titanium and zirconium and is therefore, in combination with the subsequent carbonate extraction, of considerable value in any process for the recovery of thorium from monazite sands. The separation from iron is particularly of importance, since even though the original sand may have been comparatively free of iron, the ordinary process of digesting with sulfuric acid in iron pots will serve to introduce iron into the product.

While I have described in the foregoing in considerable detail the preferred process according to my invention, together with some variants thereof, it will be understood that these data are illustrative only and for the purpose of making the invention more clear, and that the invention is not limited to the precise procedure described except in so far as the details thereof may be included within the terms of the accompanying claims, in which it is my intention to claim all novelty inherent in the invention as broadly as is permissible in view of the prior art.

I claim:

1. The method of recovering thorium from a solution containing the same in admixture with impurities of the character of those found in monazite sands, which consists in precipitating the thorium as a fluorid, and dissolving the thorium from the precipitate as a carbonate.

2. The method of recovering thorium, which consists in precipitating thorium from a solution containing the same in admixture with impurities of the character of those found in monazite sands, as a fluorid, dissolving the thorium from the precipitate as a carbonate, and re-precipitating the thorium as an hydroxid.

3. The method of recovering thorium, which consists in precipitating thorium from a solution containing the same in admixture with impurities of the character of those found in monazite sands, as a fluorid, dissolving the thorium from the precipitate as a carbonate, re-precipitating the thorium as an hydroxid, dissolving the hydroxid by a mineral acid and crystallizing the thorium from the acid solution.

4. The method of recovering thorium, which consists in precipitating the thorium from a solution carrying the same in admixture with impurities of the character of those found in monazite sands, as a fluorid, and dissolving the fluorid precipitate of thorium by a sodium carbonate solution.

5. The method of recovering thorium, which consists in precipitating the thorium selectively from an acid solution carrying the same in admixture with impurities of the character of those found in monazite sands, by the addition of a quantity of soluble fluorid sufficient to bring down the thorium without bringing down the impurities, and effecting a further purification of the thorium fluorid precipitate thus obtained by extracting the same with a solution of a soluble carbonate.

6. The method of recovering thorium, which consists in precipitating the thorium from an acid solution carrying the same in admixture with impurities of the character of those found in monazite sands, as a fluorid, and extracting the thorium from the fluorid precipitate as a soluble double carbonate by a concentrated boiling solution of sodium carbonate.

7. The method of recovering thorium, which consists in precipitating thorium from a solution carrying the same in admixture with impurities of the character of those found in monazite sands, as a fluorid, extracting the fluorid precipitate by a carbonate solution, precipitating the thorium as an hydroxid by sodium hydroxid, recovering the sodium fluorid from the thorium hydroxid filtrate, and employing the sodium fluorid for the precipitation of a further quantity of thorium as fluorid.

8. In the method of recovering and purifying thorium, dissolving thorium fluorid by means of a solution of sodium carbonate.

LONNIE W. RYAN.